United States Patent
O'Brien

(10) Patent No.: US 7,765,399 B2
(45) Date of Patent: *Jul. 27, 2010

(54) COMPUTER ARCHITECTURE FOR A HANDHELD ELECTRONIC DEVICE

(75) Inventor: Terence W. O'Brien, Webster, NY (US)

(73) Assignee: Harris Corporation, Melbourne, FL (US)

( * ) Notice: Subject to any disclaimer, the term of this patent is extended or adjusted under 35 U.S.C. 154(b) by 1192 days.

This patent is subject to a terminal disclaimer.

(21) Appl. No.: 11/359,224

(22) Filed: Feb. 22, 2006

(65) Prior Publication Data

US 2007/0199046 A1 Aug. 23, 2007

(51) Int. Cl.
*H04L 29/06* (2006.01)

(52) U.S. Cl. .......................... 713/164; 726/16

(58) Field of Classification Search ................. 713/189, 713/164, 176, 181; 726/1, 36, 26; 380/49, 380/4, 9, 25, 30, 40–60; 455/410
See application file for complete search history.

(56) References Cited

U.S. PATENT DOCUMENTS 6,092,202 A * 7/2000 Veil et al. ................... 726/27
7,028,149 B2 * 4/2006 Grawrock et al. ........... 711/156
7,047,405 B2 * 5/2006 Mauro ........................ 713/166
2006/0105740 A1 * 5/2006 Puranik ...................... 455/410

FOREIGN PATENT DOCUMENTS

GB 2336005 A * 10/1999

* cited by examiner

*Primary Examiner*—Pramila Parthasarathy
(74) *Attorney, Agent, or Firm*—Fox Rothschild, LLP; Robert J. Sacco

(57) ABSTRACT

Mobile PDA computer system (300) includes a non-secure processor (306), comprising an untrusted microprocessor and an untrusted operating system executing on the untrusted microprocessor. The system also includes a secure processor (302), comprising a trusted microprocessor and a trusted operating system executing on the trusted microprocessor. A cryptographic engine (304) is provided for encrypting and decrypting data. A first data communication link (303) communicates data between the secure processor and the cryptographic engine. A second data communication link (305) communicates data between the non-secure processor and the cryptographic engine. In this way, the cryptographic engine forms a bridge between the secure user processor and the non-secure user processor.

19 Claims, 4 Drawing Sheets

COMPUTER ARCHITECTURE FOR A HANDHELD ELECTRONIC DEVICE

BACKGROUND OF THE INVENTION

1. Statement of the Technical Field

The inventive arrangements relate to personal electronic devices, and more particularly to personal digital assistant devices for storing, processing and communicating classified as well as unclassified data.

2. Description of the Related Art

Mobile computers, which are sometimes called personal digital assistants or PDAs, have the ability to store, process and communicate data. PDAs generally fall into one of several categories which can include handheld PCs, palm size PCs, smart phones, and handheld instruments. PDAs typically include some kind of microprocessor with a commercially available operating system such as Linux, Palm OS, or Widows CE (Pocket PC). Many PDAs also have built in LCD displays, touch sensitive screens, and keypads for the human/machine interface. Some PDAs also include wireless networking capabilities. For example, many such devices can communicate with other devices using well known wireless networking standards such as the IEEE 802.11 family of standards. The foregoing capabilities make these compact devices highly useful for a various business and personal applications.

Currently, there exist a wide variety of PDA devices with conventional operating systems and architectures. These commercially available PDAs with commercial-off-the-shelf (COTS) operating systems and COTS application programs generally satisfy the processing and communications requirements of most users. For example, they include applications for word processing, data storage, spreadsheets, email, internet browsing, time management, contact management, network communications, and voice communications. These applications generally function quite well and have interfaces that are familiar to many users. The familiarity of these applications to users, and the relatively low cost of COTS software are considered advantageous for a variety of reasons.

Some commercially available PDA devices and/or software applications incorporate various security measures in an effort to protect data which is stored, processed or communicated using the device. For example, encryption technology and password protection features are known in the art. Still, this level of security can be inadequate for managing information that is of a Confidential, Secret, or Top Secret nature, particularly when such information relates to matters of national security. For example, COTS operating systems and applications may not be sufficiently trustworthy for handling this type of information. Such programs can be susceptible to being compromised by various means including hacker attacks, viruses, worms, Trojan horses, and a wide variety of other means that are known to those skilled in the art.

Finally, notwithstanding the security limitations of COTS operating systems and applications, the basic architecture and interface systems of many commercial PDA devices may leave these devices vulnerable to intrusion. For example, COTS devices do not employ trusted microprocessors, do not employ physical separation of classified and unclassified data processing, nor do they employ physical tamper detection and subsequent memory zeroization. They may also lack the capability of wireless communications for classified data. Consequently, transport, processing or communication of classified data using a commercial PDA is not generally permitted.

In order to address some of the foregoing problems, personal electronic devices have been developed that are specifically designed to allow for transport of classified data, for example encryption keys. However, these devices are not generally designed to accommodate data processing or wireless communications of classified information. Secure PDA devices are also known in the art. These devices utilize a trusted operating system, trusted microprocessors, and a trusted human/machine interface. However, they generally do not include wireless communications capabilities.

Trusted operating systems and applications are generally designed to more rigorously address the problem of computer security. Trusted operating systems undergo evaluation of their overall design, verification of the integrity and reliability of their source code, and systematic, independent penetration evaluation. In contrast, non-trusted COTS operating systems are generally not designed to an equally high level with regard to security precautions.

SUMMARY OF THE INVENTION

The invention concerns a mobile PDA computer system. The mobile PDA computer system consists of a non-secure user processor, a secure user processor, and a cryptographic engine. The non-secure processor is comprised of non-trusted COTS microprocessor hardware (HW), a non-trusted COTS operating system, and non-trusted COTS application software. The secure processor is comprised of trusted microprocessor HW, a trusted operating system and trusted application software. The cryptographic engine is comprised of trusted hardware and trusted software. In addition to providing encryption and decryption services, the cryptographic engine provides a first data communication link that communicates data between the secure processor and the cryptographic engine and a second data communication link that communicates data between the non-secure processor and the cryptographic engine. In this way, the cryptographic engine forms a bridge between the secure processing side of the PDA and the non-secure processing side of the PDA.

According to one aspect of the invention, the non-secure processor can have a wired communication transceiver and/or a wireless communications transceiver. These communication transceivers can be used to communicate unclassified data and voice transmissions. In addition these transceivers can be used to communicate encrypted classified data. The secure processor can communicate encrypted classified data files from the secure processor's file system to the non-secure processor. The encrypted files can then be communicated using the wired or wireless transceiver circuitry associated with the non-secure processor. Similarly, classified real time voice communications originating on the secure processing side of the device can be encrypted and communicated to the non-secure processor. The non-secure processor can utilize the wired or wireless transceiver to communicate such encrypted voice information.

The invention can also concern a method for managing classified and unclassified on a mobile PDA computer system. The method can include processing classified data exclusively using a secure processor. The method can also include processing unclassified data exclusively using a non-secure processor. Classified data for encryption and classified decrypted data can be communicated between the secure processor via the cryptographic engine using a first data communication link. Further classified data from the secure processor via the cryptographic engine can be communicated to the non-secure processor exclusively in an encrypted form.

Such communications can be performed using a second data communication link between the cryptographic engine and the non-secure processor.

The method can include communicating classified data to and from the secure processor exclusively using a secure human/machine interface. Further, the method can include controlling the secure processor exclusively using the secure human/machine interface. Classified information can be provided to the user from the secure processor exclusively using the secure human/machine interface.

The non-secure processor can be controlled exclusively using a non-secure human/machine interface. Further, unclassified information can be provided to the user by the non-secure processor exclusively using the non-secure human/machine interface. A wireless communications transceiver can be used for communicating wireless unclassified data from the non-secure processor. The method can further include communicating encrypted classified data provided from the secure processor using the wireless communications transceiver. According to one aspect of the invention, the wireless communications transceiver can be selected from the group consisting of a wireless LAN transceiver and a cellular telephone transceiver. According to yet another aspect, the method can include communicating classified audio information to and from the secure processor with a first audio interface, and communicating audio information to and from the non-secure processor with a second audio interface distinct from the first audio interface.

DETAILED DESCRIPTION OF THE PREFERRED EMBODIMENTS

Figure 1:
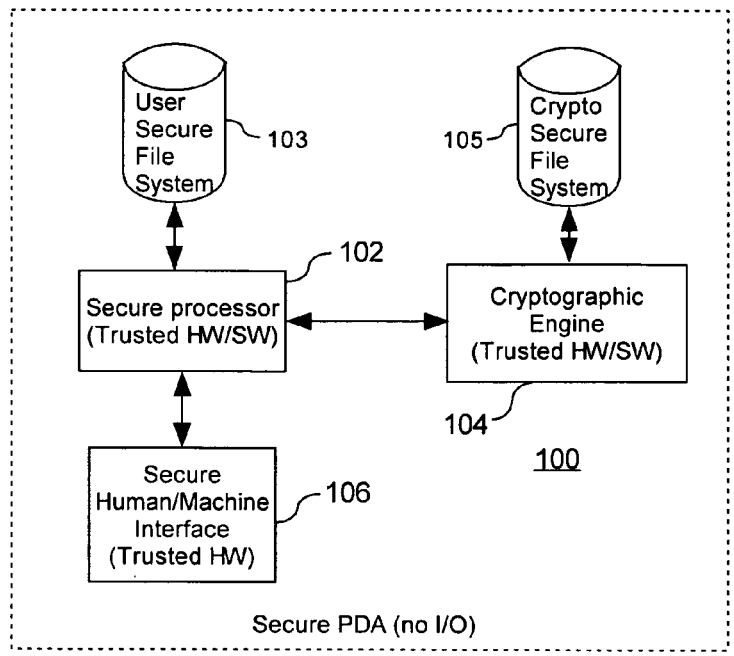
FIG. 1 is block diagram that is useful for understanding an architecture of a secure PDA

The invention concerns a computer architecture for a mobile PDA computer system. FIG. 1 shows a simplified block diagram of a secure PDA of the prior art that includes trusted hardware and trusted software (operating system and application software). As used herein, the term "trusted" is used with reference to computer hardware, operating systems, and/or software applications that have been designed to ensure secure storage, processing and communication of data. Trusted hardware and trusted software can be combined to provide secure data processing. Trusted hardware and software are generally designed and tested to ensure the integrity and reliability of their source code, and their resistance to penetration. In contrast, untrusted hardware and untrusted software are generally not designed to an equally high level with regard to security precautions. Accordingly, when integrated into a computer system, those systems are often referred to as non-secure.

Secure PDA 100 utilizes secure user processor 102 comprised of trusted hardware (HW) and trusted software (SW) for securing data that is stored on the device. A user secure file system 103 is provided for storing classified data. A cryptographic engine 104 is provided with trusted hardware and trusted software for providing encryption and decryption services. A crypto secure file system 105 is used to store classified data and files used by the cryptographic engine 104. A secure human/machine interface (HMI) 106 is also provided. However, for security reasons, PDA devices of this type generally do not include machine input/output (I/O) facilities. Thus PDA 100 does not have a USB port, wireless networking, or cellular telephone communications capabilities. PDA 100 can generally satisfy the requirements for accessing secure file systems. However, the operating system and applications can be expensive and unfamiliar to many users who more often utilize commercial-off-the-shelf (COTS) systems.

Figure 2:
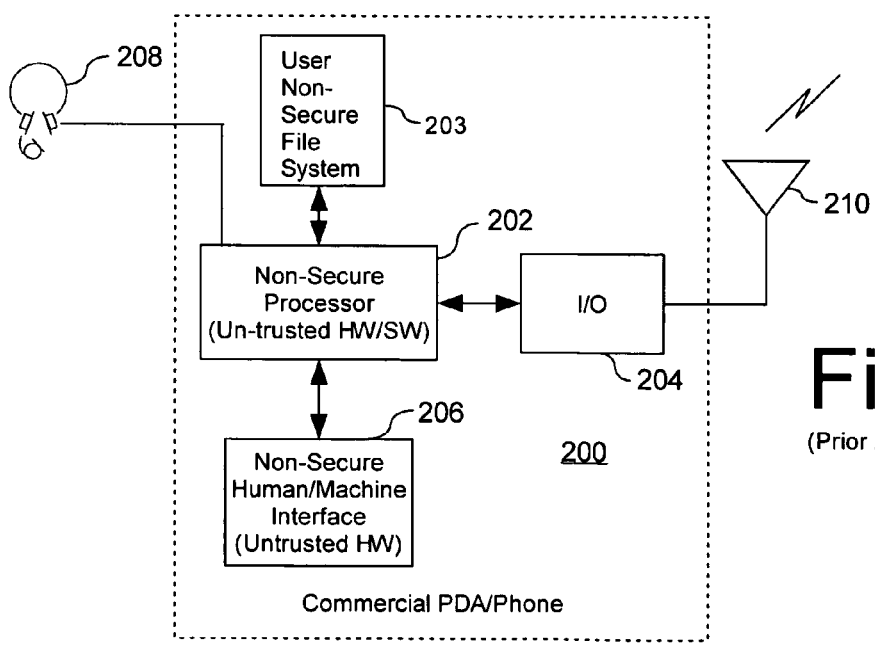
FIG. 2 is a block diagram that is useful for understanding an architecture of a non-secure commercial PDA/Phone.

In contrast to the secure PDA in FIG. 1, a commercial PDA/phone architecture is shown in FIG. 2. The commercial PDA/phone 200 can include a non-secure processor 202 comprised of untrusted COTS microprocessor hardware and untrusted COTS software. A user non-secure file system 203 can be used for storing unclassified user files and data. The commercial PDA/phone will make use of COTS hardware and software to satisfy the processing and communications requirements of users. The commercial PDA/phone will make use of a conventional non-secure HMI 206, and can include non-secure I/O circuitry 204. The I/O circuitry 204 can include wired and/or wireless LAN transceivers, and cellular telephone transceiver circuitry. A suitable antenna or antennas 210 can be provided for any wireless applications. Audio interface circuitry can also be provided for headset 208. Significantly, PDA 200 will not generally satisfy the requirements for accessing secure file systems. However, commercial PDA 200 benefits from the economy associated with use of COTS applications and a COTS operating system. Another advantage is that users tend to be well familiar with such operating systems and applications.

Figure 3:
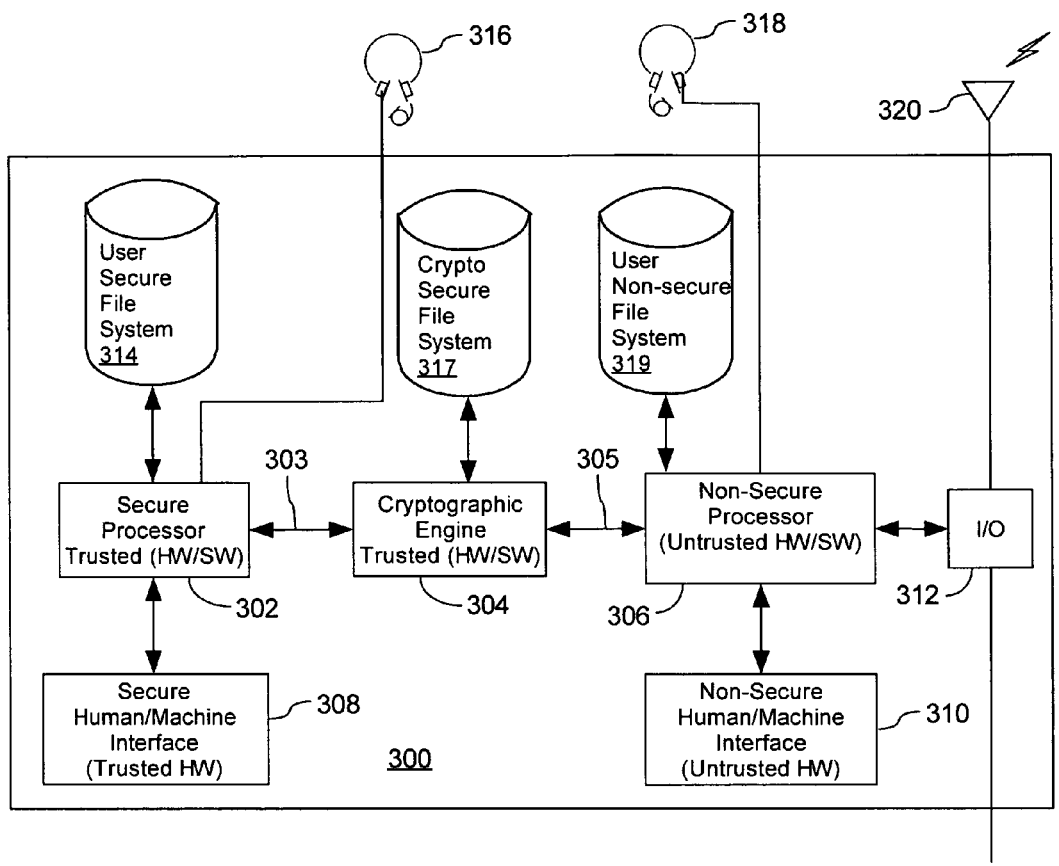
FIG. 3 is a block diagram that is useful for understanding an architecture of a PDA that can be used for classified and unclassified data.

Turning now to FIG. 3, there is shown an architecture for a mobile PDA computer system 300 that offers the combined advantages of secure PDA 100 and commercial PDA 200. The architecture in FIG. 3 can include a secure processor 302 composed of trusted microprocessor hardware executing trusted operating system software and trusted application software. Secure processor 302 can have access to a secure file system 314. Secure processor 302 receives user inputs and provides information to users through a secure HMI 308. Secure processor 302 can also communicate audio information to and from headset 316.

Non-secure processor 306 is also provided as part of PDA 300. Non-secure processor 306 is composed of untrusted microprocessor hardware executing an untrusted operating system and untrusted application software. Non-secure processor 306 can store unclassified user files and data in a user non-secure file system 319. Non-secure processor 306 is capable of receiving and transmitting data through I/O interface 312, which can include wired and/or wireless LAN transceivers, cellular telephone transceiver circuitry and any other conventional data communication service. A suitable antenna or antennas 320 can be provided for any wireless applications. A user audio interface can be provided for audio communications, audio recording and listening to audio files. Non-secure processor 306 receives user inputs and provides information to users through a non-secure HMI 310.

PDA 300 also includes a cryptographic engine 304. The cryptographic engine is implemented with trusted software (operating system and application software) and trusted microprocessor hardware. The cryptographic engine is provided for encrypting and decrypting classified data. A crypto secure file system 317 is provided for storing classified data and files used by cryptographic engine 304. A first data communication link 303 is provided for communicating classified data between the secure processor 302 and the cryptographic engine 304. A second data communication link 305 is provided for communicating encrypted classified data between the non-secure processor 306 and the cryptographic engine. Data communicated between secure processor 302 and cryptographic engine 304 will be encrypted before being passed to the non-secure processor 306. In contrast, data communicated between non-secure processor 306 and cryptographic engine 304 can be unencrypted unclassified data in some instances and encrypted classified data in other instances. Still, the invention is not limited with regard to the specific type of data that is communicated on the first and second data links.

The first and second data communication links can be any suitable type serial or parallel type data channels. For example, if the communication link is a parallel type data link then it can conform to any of a number of well known bus standards, including without limitation ISA, EISA, VESA, PCI, EMIF and so on. Alternatively, if a serial data channel is used, then it can be an 12C, SPI, Microwire, Maxim or other type serial data bus.

A PDA computer architecture as show in FIG. 3 can offer several important advantages. One basic advantage of the foregoing arrangement is that it overcomes some limitations of conventional secure and non-secure PDAs. For example, the system can still offer all of the benefits of conventional commercial PDA devices. Such features can include familiar and inexpensive COTS operating systems and applications. Such COTS operating systems and applications can be used with the non-secure processor 306. The PDA 300 also offers the benefit of wired and wireless LAN communication services, cellular telephone services and so on. In addition to these features, the PDA architecture shown in FIG. 3 can permit users to access to a secure file system. The file system can be maintained by secure processor 302 in a data store.

Figure 4:
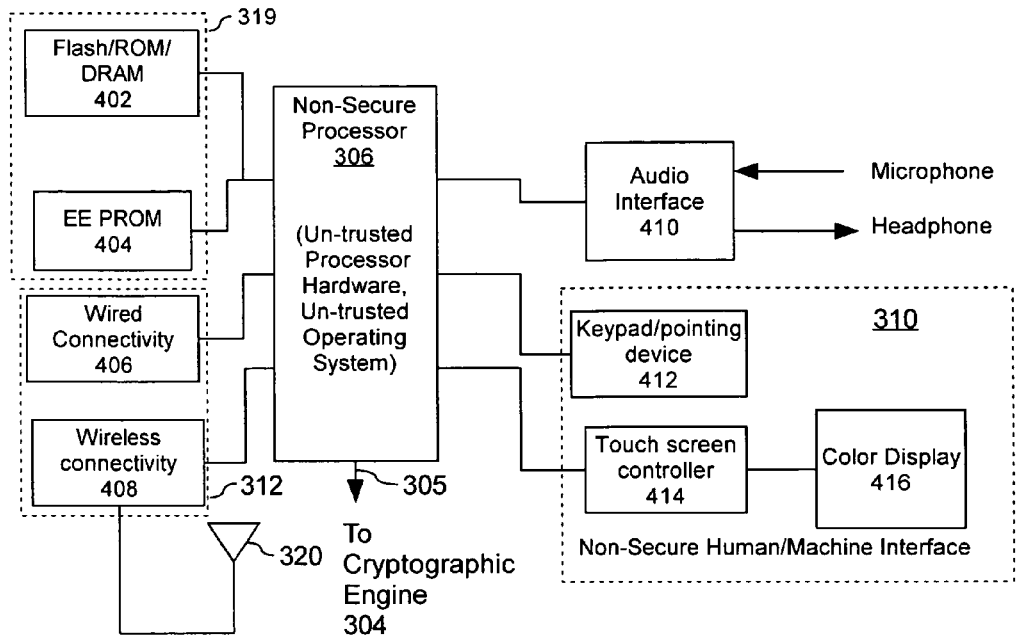
FIG. 4 is a more detailed block diagram showing the non-secure processor portion of the PDA architecture in FIG. 3.

Referring now to FIG. 4, there is shown a more detailed block diagram of a portion of the PDA 300 that includes non-secure processor 306. As noted above, non-secure processor 306 can be comprised of untrusted processor hardware. For example, the untrusted processor hardware can be any one of a variety of well known COTS processors that are widely available. For example, the un-trusted processor hardware can be selected from the StrongARM or XScale processors (e.g., SA-110 or PXA270) available from Intel Corp. of Santa Clara, Calif., the i.MX or Dragonball family of processors available from Freescale Semiconductor, Inc. of Austin, Tex., or the OMAP family of processors offered for sale by Texas Instruments of Dallas, Tex.

According to one embodiment, non-secure processor 306 can also be comprised of an untrusted COTS operating system. For example any of a variety of well known COTS operating systems suitable for use in a PDA can be used for this purpose. According to one embodiment, the non-secure processor 306 can utilize the Windows CE operating system that is made available by Microsoft Corporation of Redmond, Wash. However, the invention is not limited in this regard and other types of untrusted operating systems can also be used.

Non-secure processor 306 can communicate with one or more subsystem components including data store 402. Data store 402 can include flash memory, read-only memory (ROM), dynamic random access memory (DRAM). The un-trusted operating system for the non-secure processor can be stored in non-volatile memory in data store 402 or flash EE PROM 404. Application software can be loaded in flash memory or DRAM as needed.

As shown in FIG. 4, I/O interface 312 can include wired connectivity block 406 for USB or other wired connectivity services. Wireless connectivity block 408 can include any wireless transceiver system now known or known in the future for communicating voice and/or data. For example, the wireless connectivity block 408 can be any suitable wireless LAN transceiver system. According to one embodiment of the invention, wireless connectivity block 408 can be configured for operation in accordance with any one of the 802.11 family of wireless network standards. However the invention is not limited in this regard. Instead, any other wireless networking standard can also be implemented in accordance with the inventive arrangements. Further, wireless connectivity block 408 can also comprise cellular telephone transceiver circuitry. For example, the cellular telephone transceiver circuitry can be designed to operate using any one of a variety of well known cellular telephone transmission protocols such as TDM, GSM, or CDMA.

Additional sub-systems connected to non-secure processor 306 can include audio interface 410. Audio interface 410 can include at least one suitable audio codec, analog to digital and digital to analog conversion circuitry, as well as any necessary audio amplifier circuitry (not shown). Audio interface 410 can also include any other circuitry necessary to allow PDA 300 to output MP3 audio associated with the non-secure processor 306.

In the event that wireless input/output subsystem 312 includes cellular telephone transceiver circuitry, then the audio interface 410 can include a voice codec that can provide the user audio interface for that application. In particular, the voice codec can code voice signals received from a microphone associated with headset 318. Similarly, the voice codec can decode voice signals received via wireless connectivity block 408 and output such decoded audio to an earphone associated with headset 318. Still, it should be understood that the invention is not limited to any particular arrangement with regard to audio interface 410. Audio interfaces for cellular telephones and MP3 audio playback are well known in the art and all such arrangements are contemplated for audio interface 410 within the scope of the present invention.

Non-secure processor 306 can interface with a user through non-secure HMI 310. Non-secure HMI 310 can include a conventional color display 416 and touch screen controller 414. Non-secure HMI 206 can also include a keypad/pointing device 412. HMI interfaces of the type described herein are well known in the art. In this regard it should be understood that the non-secure HMI interface is not limited to the specific embodiments shown. Instead, any other suitable non-secure HMI interface can be used for this purpose.

Figure 5:
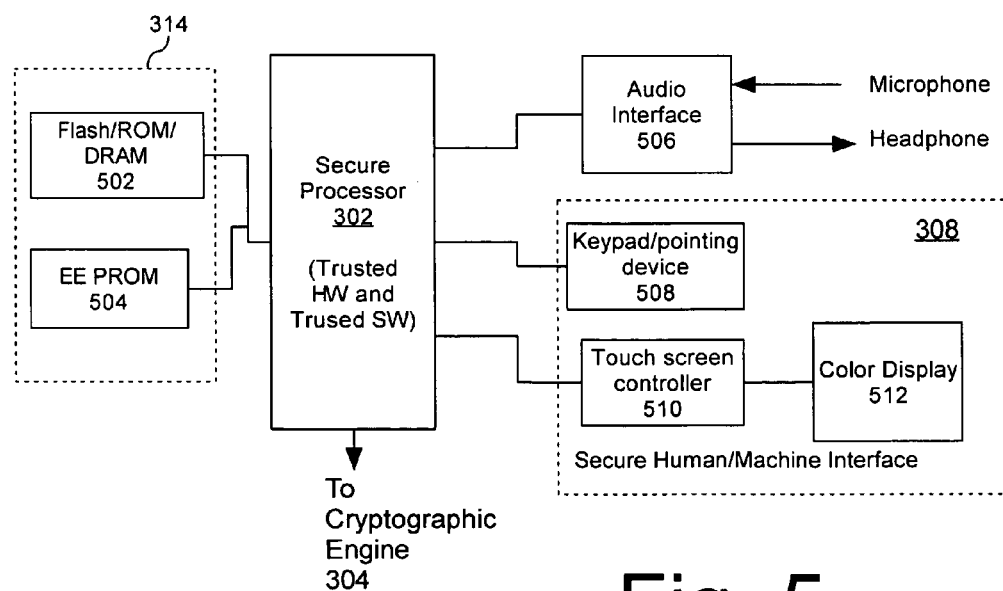
FIG. 5 is a more detailed block diagram showing the secure processor portion of the PDA architecture in FIG. 3.

Referring now to FIG. 5, there is shown a more detailed block diagram of the portion of PDA 300 including secure processor 302. Secure processor 302 can be custom-designed processor or can also be one of a variety of well known COTS processors that are widely available. Regardless of whether the secure processor 302 is comprised of custom components, COTS components, or a mixture of custom and COTS components, the secure processor must be designed and developed utilizing trusted methods and techniques to ensure the integrity and reliability of the device, and its resistance to penetration. For example, the secure processor 302 can be housed inside a physical barrier that will detect any attempt to open the enclosure and automatically zeroize any stored sensitive/classified information contained within. The secure processor 302 can also be housed inside an enclosure that provides radio frequency (RF) shielding to guard against radiating sensitive/classified information.

Secure processor 302 will also have trusted operating system software and trusted application software. Trusted software is designed and tested to ensure the integrity and reliability of the code, and its resistance to penetration. For example, trusted software must be developed utilizing trusted techniques, which may include peer reviews, testing of all paths through the control logic, and in some cases, a mathematical proof of correctness.

Secure processor 302 can communicate with one or more subsystem components including data store 502. Data store 502 can include flash memory, read-only memory (ROM), dynamic random access memory (DRAM). The trusted operating system used in secure processor 302 can be stored in non-volatile memory in data store 502 or flash EE PROM 504. Application software can be loaded in flash memory or DRAM as needed. Additional sub-systems connected to secure processor 302 can include audio interface 506.

Audio interface 506 can include at least one suitable audio codec, analog to digital and digital to analog conversion circuitry, as well as any necessary audio amplifier circuitry (not shown). Audio interface 506 can also include any other circuitry necessary to allow PDA 300 to output MP3 audio associated with the secure processor 302. In the event that wireless input/output subsystem 312 includes cellular telephone transceiver circuitry, then the audio interface 506 can include a voice codec that can provide the user audio interface for that application. In particular, the voice codec can code voice signals received from a microphone associated with headset 316. Similarly, the voice codec can decode voice signals received via wireless connectivity block 408 and output such decoded audio to an earphone associated with headset 316. Still, it should be understood that the invention is not limited to any particular arrangement with regard to audio interface 506. Audio interfaces for cellular telephones and MP3 audio playback are well known in the art and all such arrangements are contemplated for audio interface 506 within the scope of the present invention.

Secure processor 302 can also communicate with secure HMI 308. Secure HMI devices are known in the art and typically can include one or more features to ensure trusted communications between the user and the secure processor 302. The secure HMI 308 can provide a trusted path to applications executing on secure processor 302. Consequently, secure HMI 308 can prevent invasive or unauthorized applications from monitoring user inputs and system outputs.

According to one embodiment of the invention, the secure HMI 308 can be at least partially contained within a shielded enclosure. Moreover, the power supply lines for the secure HMI 308 can be filtered to ensure that signals associated with secure processor 302 are not communicated along the power supply lines back to the non-secure processor 306. The secure HMI 308 can also be designed to prevent a user from being misled about which application is actually in use. For example, this can be accomplished by means of highly distinctive and easily recognized visual display indications that cannot be obstructed. Such indicators can assure the user regarding the identity of the application with which the user is working. Secure HMI features of this type are implemented in a variety of ways that are known to those skilled in the art.

Referring now to FIG. 5, it can be observed that the secure HMI 308 can be comprised of several components. For example, secure HMI 308 can include one or more input devices which allow a user to input control commands and input data. According to one embodiment, these input devices can include a pointing keypad/pointing device 508 and a touch screen controller 510. However, the invention is not limited in this regard. The secure HMI 308 can also include a display 512, which can present alphanumeric and graphical data. The display 512 can be a color or monochrome type display. Further, one or more data ports (not shown) can be provided as part of the human/machine interface. The data ports can be any type of wired data interface. According to one embodiment, the data ports can conform to the well known USB standard. The data ports can be used for input and output of data. The data ports can also be used for connecting certain peripheral devices to the PDA 300. For example, the data ports can be used for connecting an external keyboard to the PDA 300.

Figure 6:
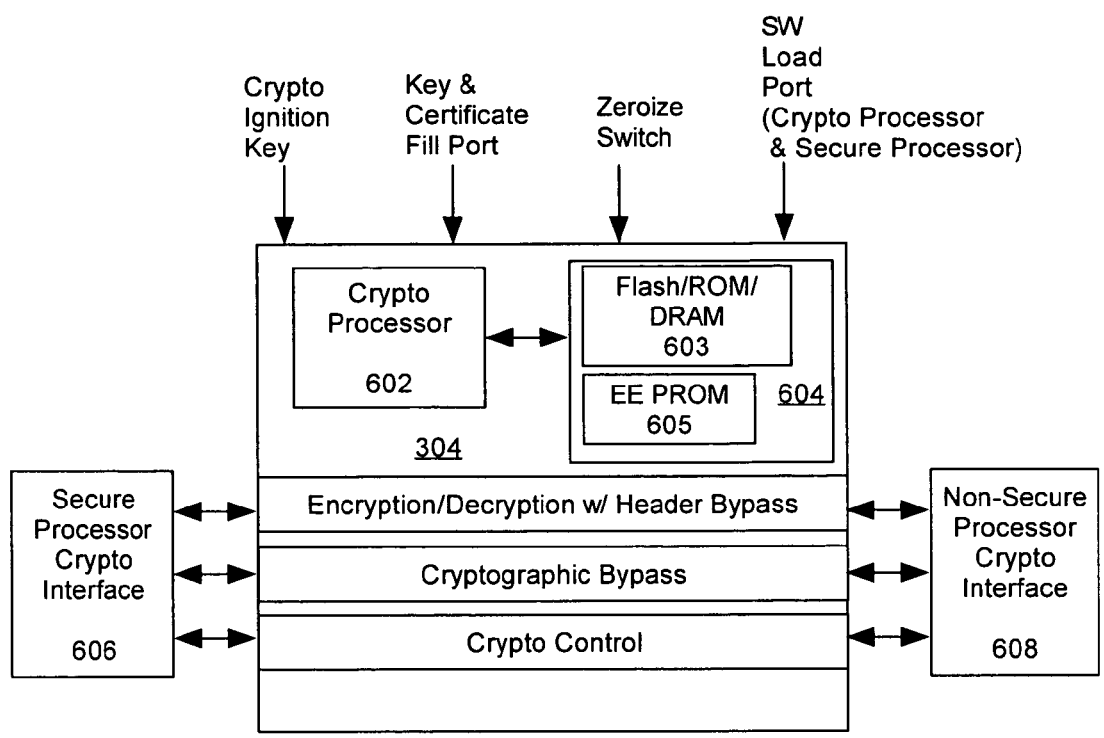
FIG. 6 is a more detailed block diagram of the cryptographic engine in FIG. 3.

Referring now to FIG. 6, there is shown a more detailed block diagram of cryptographic engine 304. Cryptographic engine 304 can include a cryptographic processor 602 and a cryptographic file system 604 maintained in a data store. Cryptographic engine 304 can be one of several available cryptographic engines. According to one embodiment, the cryptographic engine can be a Sierra II Crypto processor which is available from Harris Corporation of Melbourne, Fla. The cryptographic engine can include configurable key lengths and can be programmed with one or more encryption algorithms. As illustrated in FIG. 6, cryptographic engine 304 can include several control and data ports including a crypto ignition key port, a key and certificate fill port, a zeroize switch, and a software load port. The software load port can be used for loading software for executing on the cryptographic engine 304 and for loading software used by secure processor 302.

The cryptographic file system 604 can be used to store cryptographic algorithms, crypto keys and certificates, audit data, policy profile, and any other information necessary for the operation of the cryptographic engine. The cryptographic engine 304 can also include one or more security features. For example, the cryptographic engine 304 can include a secure certified operating environment, security auditing, security policy enforcement, file integrity checking and/or trusted boot logic. Cryptographic file system 604 can be implemented in flash/ROM/DRAM 603 and/or EE PROM 605.

As shown in FIG. 6, the cryptographic engine 304 can be responsive to one or more control signals from secure processor 302 and non-secure processor 306 to provide various encryption functions. For example, according to one aspect of the invention, the cryptographic engine can provide an encryption/decryption function for data communicated between the secure and non-secure processors. The encryption function can be implemented with or without packet header bypass.

The functions of the cryptographic engine 304 can be responsive to crypto control signals received from the secure processor 302 and non-secure processor 306 via the crypto interfaces 606, 608. For example, any data of a sensitive nature that is transferred from the secure processor to the cryptographic engine 304 must be encrypted before being transferred to the non-secure processor.

With the PDA architecture as described herein in relation to FIG. 3, the user is capable of storing, processing, and communicating classified as well as unclassified data. Unclassified data storage and user processing of unclassified data can be performed by non-secure processor 306. The architecture provides for the use of untrusted COTS operating systems and COTS applications for the non-secure user. The use of COTS hardware and software for the non-secure processor provides the users with familiar user interfaces expected by the user community. In contrast, classified data storage and user processing of classified data can be provided using the secure processor 302 and a secure file system 314 accessed by secure processor 302. Any data of a sensitive nature transferred from the secure processor to the non-secure processor can be encrypted by the cryptographic engine 304. An advantage of the foregoing architecture is that it (1) provides for physical separation of classified data from data which is unclassified or encrypted/classified data, and (2) provides secure access to sensitive files.

The foregoing arrangement also facilitates a secure/non-secure PDA architecture that provides for wired and wireless communications capabilities. Unclassified data can be transmitted using conventional wired connectivity 406 or wireless connectivity 408. Significantly, however, data that is of a sensitive nature can also be transmitted. For example, encrypted data stored in a secure file system associated with secure processor 302 can be communicated from secure processor 302 to non-secure processor 306, without being unencrypted. Unencrypted data can be encrypted by cryptographic engine 304 before being communicated from the secure processor 302 to the non-secure processor 306. Thereafter, the encrypted data can be communicated over-the-air by means of non-secure processor 306 and wired connectivity 408 using COTS software applications. Likewise, text messages and other communications originating from the secure HMI 308 can be encrypted when passed from secure processor 302 to non-secure processor 306. Consequently, any of the wired connectivity 406 or wireless connectivity services 406 can be used to communicate the data to third parties.

Another advantage of the foregoing arrangement is that it allows a user with classified and unclassified voice communications to take advantage of the wireless connectivity 408 for telecommunications services. For example, if the PDA 300 is equipped with a cellular telephone transceiver or other wireless transceiver that can be used for voice communications, then a user can plug in a headset 316 to provide encrypted communications with third parties. Audio data communicated to secure processor 302 by headset 316 can be encrypted by cryptographic engine 304 before ever passing to the non-secure side of the architecture of PDA 300. Likewise, classified audio communications can be received in an encrypted state and can remain encrypted until passing to the secure processor side of the PDA 300. Unclassified voice communications can be conducted using headset 318 and non-secure processor 306 in the conventional manner. However, under no circumstances will classified audio information be communicated to the non-secure audio processing hardware so it cannot be inadvertently transmitted in an unencrypted state.

I claim:

1. A computer system, comprising:
 a portable mobile computing device including a secure user processor, a non-secure user processor, a communications transceiver, and a cryptographic engine;
 said secure user processor comprising
  a trusted microprocessor,
  a trusted operating system executing on said trusted microprocessor, and
  a trusted application software executing on said trusted microprocessor;
 said non-secure user processor comprising
  an untrusted microprocessor,
  an untrusted operating system executing on said untrusted microprocessor, and
  an untrusted application software executing on said untrusted microprocessor;
 said cryptographic engine configured for encrypting any data communicated from said secure user processor to said non-secure user processor, comprising
  a trusted cryptographic processor, and
  a trusted operating system executing on said trusted cryptographic processor;
 a first data communication link communicating data between said secure processor and said cryptographic engine;
 a second data communication link communicating data between said non-secure processor and said cryptographic engine;
 a secure human/machine interface configured for enabling bi-directional communication of classified information exclusively between a user and said secure user processor; and
 a non-secure human/machine interface distinct from said secure human/machine interface and configured for enabling bi-directional communication of unclassified information exclusively between said user and said non-secure user processor;
 wherein said communications transceiver is operatively coupled to said non-secure user processor and configured for communicating data external to said portable mobile computing device.

2. The computer system according to claim 1, wherein said secure human/machine interface comprises at least one input device to allow said user to control the secure user processor.

3. The computer system according to claim 2, wherein said secure human/machine interface comprises at least one output device to allow the secure user processor to inform said user.

4. The computer system according to claim 1, wherein said non-secure human/machine interface comprises at least one input device to allow said user to control the non-secure user processor.

5. The computer system according to claim 4, wherein said non-secure human/machine interface comprises at least one output device to allow the non-secure user processor to inform said user.

6. The computer system according to claim 1, wherein said communications transceiver is selected from the group consisting of a wireless LAN transceiver and a cellular telephone transceiver.

7. The mobile PDA computer system according to claim 1, further comprising a first file system exclusively accessible to said secure user processor for storing classified data and a second file system for storing unclassified data, said second file system distinct from said first file system so as to provide physical separation of said classified data from said unclassified data within said portable mobile computing device.

8. A computer system, comprising:
 a portable mobile computing device including a secure user processor, a non-secure user processor, a communications transceiver, and a cryptographic engine;
 said secure user processor comprising
  a trusted microprocessor,
  a trusted operating system executing on said trusted microprocessor, and
  a trusted application software executing on said trusted microprocessor;
 said non-secure user processor comprising
  an untrusted microprocessor,
  an untrusted operating system executing on said untrusted microprocessor, and
  an untrusted application software executing on said untrusted microprocessor;

said cryptographic engine configured for encrypting any data communicated from said secure user processor to said non-secure user processor, comprising
a trusted cryptographic processor, and
a trusted operating system executing on said trusted cryptographic processor;
a first data communication link communicating data between said secure processor and said cryptographic engine;
a second data communication link communicating data between said non-secure processor and said cryptographic engine; and
first and second audio interfaces, said first audio interface configured for communicating audio information to and from said secure user processor, and said second audio interface configured for communicating audio information to and from said non-secure user processor;
wherein said communications transceiver is operatively coupled to said non-secure user processor, is configured for communicating data external to said portable mobile computing device, and is selected from the group consisting of a wireless LAN transceiver and a cellular telephone transceiver.

9. A computer system, comprising:
a portable mobile computing device including a secure user processor, a non-secure user processor, a communications transceiver, and a cryptographic engine,
said communications transceiver operatively coupled to said non-secure user processor and configured for communicating data external to said portable mobile computing device,
said secure user processor comprising
a trusted microprocessor,
a trusted operating system executing on said trusted microprocessor, and
a trusted application software executing on said trusted microprocessor;
said non-secure user processor comprising
an untrusted microprocessor,
an untrusted operating system executing on said untrusted microprocessor, and
an untrusted application software executing on said untrusted microprocessor;
said cryptographic engine configured for encrypting data communicated from said secure user processor to said non-secure user processor, comprising a trusted cryptographic processor, and a trusted operating system executing on said trusted cryptographic processor;
a first data communication link communicating data between said secure user processor and said cryptographic engine;
a second data communication link communicating data between said non-secure user processor and said cryptographic engine;
a secure human/machine interface communicatively coupled to said secure user processor and configured to enable bi-directional communication of classified information exclusively between a user and said secure user processor, at least a portion of said secure human/machine interface located in a physically secure enclosure; and
a non-secure human/machine interface communicatively coupled to said non-secure user processor and configured to enable bi-directional communication of unclassified information exclusively between said user and said non-secure user processor, said non-secure human/machine interface distinct from said secure human/machine interface.

10. The computer system according to claim 9, wherein said non-secure user processor is operatively connected to said communications transceiver.

11. A computer system, comprising:
a portable mobile computing device including a secure user processor, a non-secure user processor, a communications transceiver, and a cryptographic engine, said communications transceiver operatively coupled to said non-secure user processor and configured for communicating data external to said portable mobile computing device,
said secure user processor comprising
a trusted microprocessor,
a trusted operating system executing on said trusted microprocessor, and
a trusted application software executing on said trusted microprocessor;
said non-secure user processor comprising
an untrusted microprocessor,
an untrusted operating system executing on said untrusted microprocessor, and
an untrusted application software executing on said untrusted microprocessor;
said cryptographic engine configured for encrypting data communicated from said secure user processor to said non-secure user processor, comprising a trusted cryptographic processor, and a trusted operating system executing on said trusted cryptophic processor;
a first data communication link communicating data between said secure user processor and said cryptographic engine;
a second data communication link communicating data between said non-secure user processor and said cryptographic engine;
a secure human/machine interface communicatively coupled to said secure user processor and configured to provide a user of said portable mobile computing device with access and control of said secure user processor;
a non-secure human/machine interface communicatively coupled to said non-secure user processor and configured to provide said user with access and control of said non-secure user processor, said non-secure human/machine interface distinct from said secure human/machine interface;
a first audio interface for communicating audio information to and from said secure user processor; and
a second audio interface for communicating audio information to and from said non-secure user processor.

12. A method for managing classified and unclassified data on a portable mobile computing device of a computer system, comprising:
processing said classified data exclusively using a secure processor of said portable mobile computing device, said secure processor comprising a trusted microprocessor and a trusted operating system executing on said trusted microprocessor;
processing unclassified data exclusively using a non-secure processor of said portable mobile computing device, said non-secure processor comprising an untrusted microprocessor and an untrusted operating system executing on said untrusted microprocessor;
communicating encrypted and decrypted classified data between said secure processor and a cryptographic engine of said portable mobile computing device using a first data communication link;

communicating data from said secure processor and said cryptographic engine to said non-secure processor exclusively in an encrypted form using a second data communication link between said cryptographic engine and said non-secure processor;

communicating classified information to and from said secure processor using a secure human/machine interface that is configured for enabling bi-directional communication of classified information exclusively between a user and said secure processor; and communicating unclassified information to and from non-secure processor using a non-secure human/machine interface that is distinct from said secure human/machine interface and configured for enabling bi-directional communication of unclassified information exclusively between said user and said non-secure processor.

13. The method according to claim 12, further comprising controlling said secure processor exclusively using said secure human/machine interface.

14. The method according to claim 12, further comprising controlling said non-secure processor exclusively using a non-secure human/machine interface.

15. The method according to claim 12, further comprising performing wireless data communication of unclassified data from said non-secure processor using a wireless communications transceiver.

16. The method according to claim 15, further comprising communicating encrypted classified data from said secure processor using said wireless communications transceiver.

17. The method according to claim 15, further comprising selecting said wireless communications transceiver from the group consisting of a wireless LAN transceiver and a cellular telephone transceiver.

18. The method according to claim 12, further comprising storing classified data in a first file system accessible only to said secure user processor and storing unclassified data in a second file system distinct from said first file system which is accessible to said non-secure user processor, thereby providing physical separation of said classified data from said unclassified data within said portable mobile computing device.

19. A method for managing classified and unclassified data on a portable mobile computing device of a computer system, comprising:

processing said classified data exclusively using a secure processor of said portable mobile computing device, said secure processor comprising a trusted microprocessor and a trusted operating system executing on said trusted microprocessor;

processing unclassified data exclusively using a non-secure processor of said portable mobile computing device, said non-secure processor comprising an untrusted microprocessor and an untrusted operating system executing on said untrusted microprocessor;

communicating encrypted and decrypted classified data between said secure processor and a cryptographic engine of said portable mobile computing device using a first data communication link;

communicating data from said secure processor and said cryptographic engine to said non-secure processor exclusively in an encrypted form using a second data communication link between said cryptographic engine and said non-secure processor;

performing wireless data communication of said unclassified data from said non-secure processor using a wireless communications transceiver;

selecting said wireless communications transceiver from the group consisting of a wireless LAN transceiver and a cellular telephone transceiver;

communicating classified audio information to and from said secure processor with a first audio interface; and communicating unclassified audio information to and from said processor with a second audio interface distinct from said first audio interface.

* * * * *